United States Patent Office 3,404,616
Patented Oct. 8, 1968

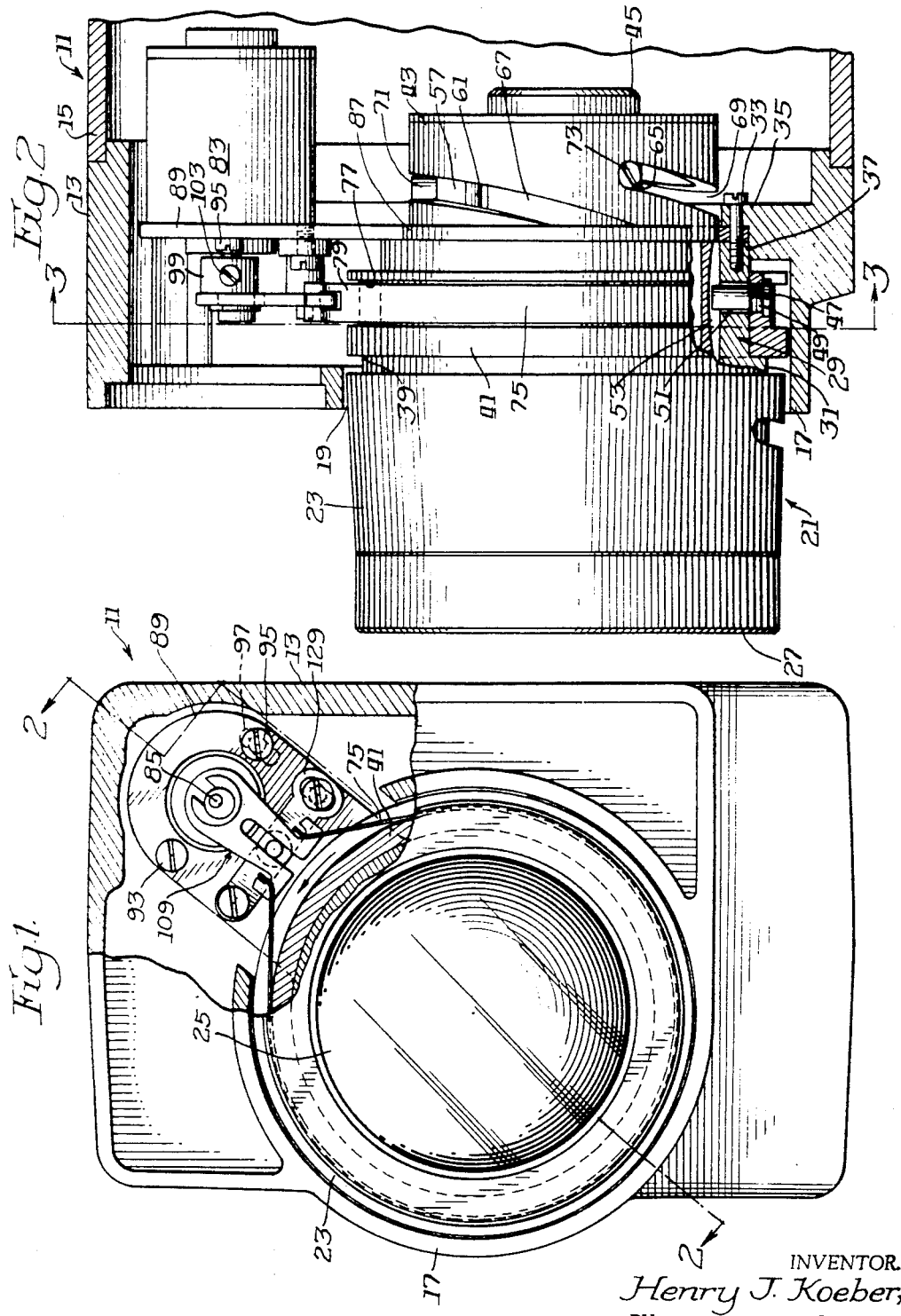

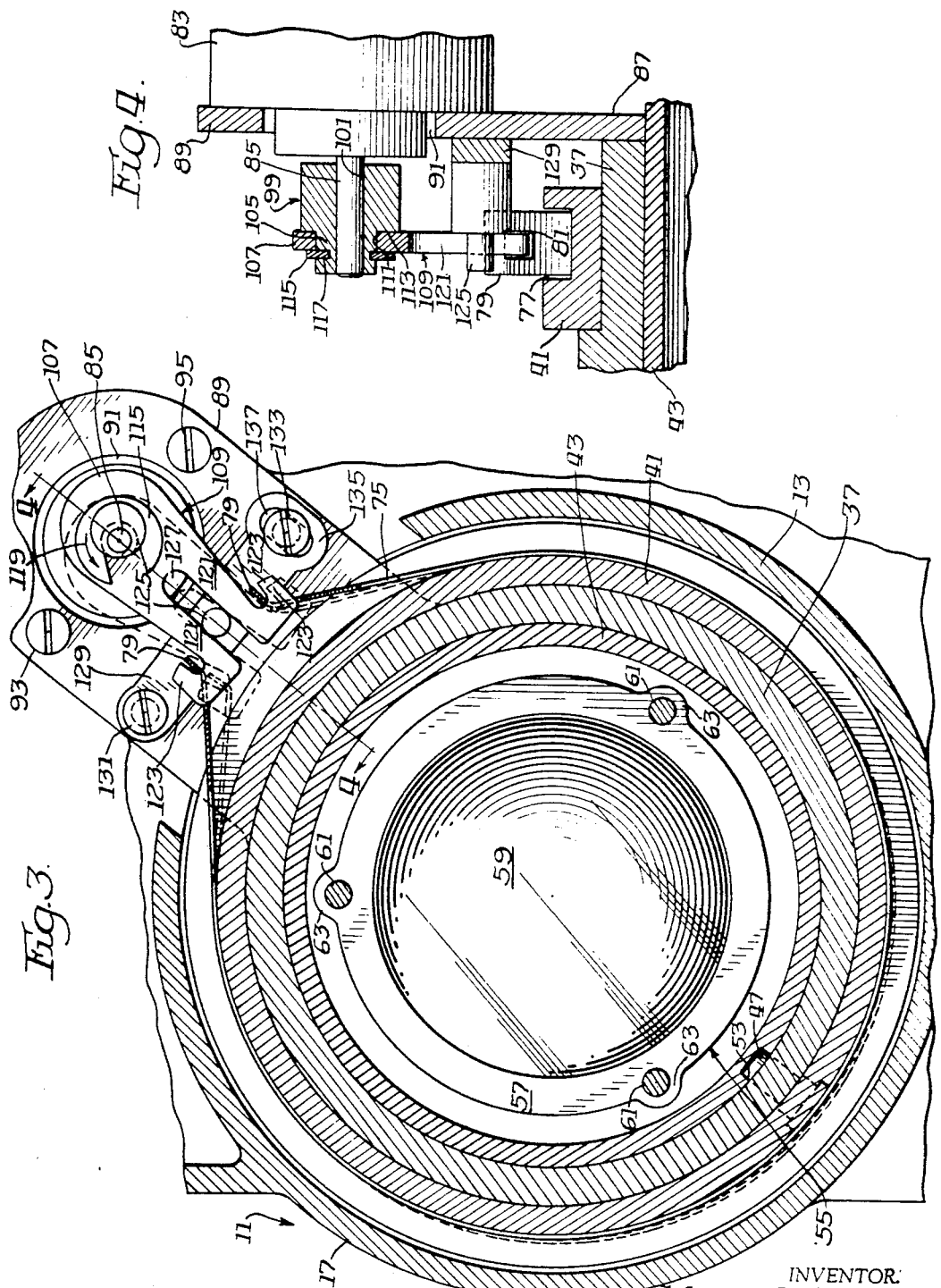

3,404,616
DRIVE MECHANISM WITH INTERMITTENTLY POWERED BAND
Henry J. Koeber, Jr., Deerfield, Ill., assignor to Bell & Howell Company, Chicago, Ill., a corporation of Illinois
Filed July 21, 1966, Ser. No. 566,922
10 Claims. (Cl. 95—45)

The present invention relates to motion transmission mechanisms. Particularly, the invention concerns a novel intermittent power transmission designed especially but not exclusively for reversible rotation of a member to control axial displacement of a zoom lens mechanism in a camera.

In an intermittent power transmission of the class with which the instant invention is concerned, a band is intermittently, and at high frequency, tightened by torque action on the surface of a rotary part to which the torque is imparted. When the band slackens it has no action on the rotary part, and as a result, the latter is rotated intermittently through small arcs. Because of the frequency of the intermittent motion, the rotary part may appear to be rotated with constant motion.

It is found that this type of high frequency intermittent rotation is adapted for reversible control of mount means of a zoom lens mechanism of a camera whereby the lens mechanism may be adjusted longitudinally of its optical axis. It is especially suited where space limitation in such camera may be a consideration. That is to say, customarily a zoom lens mechanism is driven for axial adjustment by a torque applied to lens mount means through a space consuming gear reduction train. Moreover, by employing an intermittent power transmission of the indicated class, customarily employed clutch means can be obtained in a zoom lens camera.

Heretofore known intermittent power transmissions are unidirectional and, therefore, when actuated, are adapted to impart corresponding torque to a rotary part. Such characteristic limits usefulness of the transmissions generally and render them unsuited for zoom lens control. The principal object of the invention is to improve the construction of a power transmission so that it becomes practical for general purposes and especially for the particular purpose described herein.

It is another object of the invention to provide means for causing an intermitten power transmission to slip during its normal drive phases to selectively curtail power transmission to a rotor while torque of a motive force continues to drive the transmission. Thereby, the transmission becomes adapted for zoom lens operation because the transmission can operate notwithstanding limitation of movement of a zoom lens mount after it reaches the ends of its track.

It is a further object of the invention to provide an intermittent power transmission of the described class which may be reversibly driven.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a front elevation of a camera embodying the present invention, parts being broken away for the purpose of illustration.

FIG. 2 is a planar projection of a view taken along the planes of the broken lines 2—2 of FIG. 1 and looking in the direction of the arrows.

FIG. 3 is an enlarged sectional view of said embodiment taken on the plane of line 3—3 of FIG. 2 and looking in the direction of the arrows.

FIG. 4 is a sectional view taken along the plane of line 4—4 of FIG. 3 and looking in the direction of the arrows.

Referring now more particularly to the drawings, there is shown a camera comprising a two piece housing 11 having a front section 13 and a rear section 15 suitably releaseably connected each to the other. The front housing section 13 is fashioned with a forwardly projecting annulus 17 which defines an opening 19 (FIG. 2). A camera works assembly generally designated 21 is mounted in the housing 11 and comprises an adjustable sleeve or focusing lens mount 23 which projects forwardly from the opening 19.

The sleeve 23 is circular in cross section and has a forward end opening 27. The peripheral portion of a lens means including a fixed lens 25 (FIG. 1) is secured in a medial portion of the sleeve 23 with its optical axis coincident with the axis about which the opening 27 is formed.

The assembly 21 comprises a tube-like body 29 (FIG. 2) which comprises a forward tubular section 31. The latter has a part extending forwardly from the housing section 13 and defining means upon which the sleeve 23 is concentrically mounted for adjustment together with lens 25 longitudinally of its optical axis by means well known in the art. The rear tubular section 37 of said tube-like body 29 is disposed in the casing section 13 and is secured by a fastening means including a screw 33 to a boss 35, said boss being an integral extension of the casing section 13.

The external diameter of the tubular section 37 is smaller than the external diameter of the tubular section 31 and thereby generates a shoulder 39 (FIG. 2) at the juncture of said tubular sections. A drive ring 41 is mounted about the tubular section 37 and forwardly abuts shoulder 39. The internal diameter of the ring 41 is dimensioned in a manner such that it is normally retained by the outer surface of the tubular section 37. However, it is free to rotate independently of said section upon application of torque in a manner which will hereinafter be described.

A cylindrical zoom lens control body 43 (FIGS. 2 and 3) is mounted concentrically within the tubular section 37. It is arranged in said last section for partial rotation about the axis thereof. A rear end portion of said cylindrical body 43 projects outwardly from a rear end opening of the tubular section 37. A suitable optical objective assembly 45 (FIG. 2) is carried at the rear end portion of said cylindrical body 43, the lens (not shown) of said objective 45 being disposed in optical alignment with the focusing lens 25.

A drive pin 47 (FIG. 2) has an outer threaded portion 49 which screws into the drive ring 41. The tubular section 37 is slotted as at 51 to pass the shank of pin 47 inwardly into snug engagement in a pocket 53 formed in said tubular body 43. Thereby, as the drive ring 41 is rotated, the rotational torque will be transmitted through the pin 47 to the cylindrical zoom lens control body 43.

A zoom lens assembly generally designated 55 (FIG. 3) is mounted within the tubular body 43. Said zoom lens assembly comprises a first frame 57 with a therein held lens 59 arranged in optical alignment with and between the focusing lens 25 and the lens of the objective 45. A plurality of rails 61 (FIGS. 2 and 3) extend within the cylindrical body 43 longitudinally thereof about and parallel to its axis. The frame 57 has a plurality of ears 63 which slidingly engage about rails 61, respectively, to guide the lens 59 longitudinally of its axis. The zoom lens assembly 55 also comprises a second lens frame 65 (FIG. 2) which is slidably adjustable longitudinally of rails 61 and is disposed behind the frame 57. Lens frame 65 supports a lens (not shown) in optical alignment with the lens 59.

In the illustrated embodiment, the zoom lens control body 43 has a pair of cam slots 67 and 69 (FIG. 2) the configuration of which is predetermined in a manner well known in the art to control the path of the zoom lens frame 57 and lens construction 65, respectively as the zoom lens control body is rotated. To slide said frames, the first frame 57 carries a cam follower 71 which slidably engages in the slot 67 and the second frame 65 carries a cam follower 73 which slidably engages in the slot 69.

While a specific zoom lens camera construction is shown, the details of such construction are not intended as limiting on the present invention but only serve to illustrate one use for the invention. The improvements with which the present invention is concerned relate to the means by which a rotor (herein the cylindrical body 43) is reversibly rotationally motivated (herein causing zoom lens assembly adjustment).

A friction band 75 is provided for that purpose. An external annular recess 77 (FIG. 4) fashioned in the drive ring 41 defines a seat in which the band 75 engages for partial encirclement of said drive ring. The band 75 may be fabricated of steel and has a pair of opposite end portions 79 (FIGS. 3 and 4) each of which has an aperture 81 to facilitate connection of the band 75 to motive means to be defined in the description next ensuing.

The motive means comprises an electrical motor 83 which has an output shaft 85 (FIG. 4) disposed between and spaced from the band end portions 79. A motor mount 87 (FIGS. 2 and 4) may be secured to the casing section 13 and to the rear end of the tubular section 37 by the same fasteners including the screws 33 which connect the tubular member 31 to the boss 35.

What, for the purpose of description, may be referred to as the upper part 89 of said motor mount is apertured as at 91 to accommodate passage of the motor shaft 85 which projects outwardly from the forward face of said mount 87. The casing of the motor 83 is secured against the opposite face of the motor mount by means of a pair of screws 93 and 95 (FIG. 1). In the present embodiment screw 93 provides a pivot about which the motor 83 may be rocked. The upper mount portion 89 may have an elongated slot 97 (shown dotted in FIG. 1) longitudinally of which the screw 95 is adjustable.

A cam block 99 (FIGS. 2 and 3) having an eccentric bore 101 is secured to the motor shaft 85 by means of a set screw 103. The cam block 99 is fabricated of a suitable anti-friction bearing material and has a reduced portion 105 (FIG. 2) which presents an external annulus relative to which the bore 101 and the therein disposed shaft 85 are eccentrically disposed. What, for descriptive purposes, may be considered the upper or hub end portion 107 of a torque transmission link generally designated 109 has an aperture 111 through which the cam block end portion 105 projects in rotational bearing engagement. The link 109 is retained on the cam block 99 in the plane of band 75 between a shoulder 113 generated by the formation of the reduced end portion 105 and a retaining bearing member 115 (FIG. 4) which is held in a slot 117 formed in the reduced end portion 105. Therefore, the link 109 will rock according to the direction of rotation of the output shaft 85. For example, when the shaft 85 rotates in the direction of arrow 119 in FIG. 3, the link will move in a path from the solid line position to the dotted line position of said figure.

The link 109 comprises a pair of symmetrically arranged and spaced apart legs 121 which extend what for description is considered downwardly from the upper hub part 107 of said link. Each of the legs 121 has a hook or boss 123 (FIG. 3) which projects in anchoring relationship through a respective aperture 81 whereby the opposite end portions 79 of the band 75 are secured to the link 109.

The foregoing arrangement causes tension of the band 75 to be cyclically increased and relaxed as the link 109 is cyclically motivated. The parts are proportioned in a manner such that during the normal tension phase of each cycle the band 75 will be in frictional driving relationship with the ring 41 causing the latter to rotate partially about the optical center of the device. Whereas, during the relaxed phase of each cycle, the band will slip with respect to said ring. Thereby, the ring 41 may be driven intermittently in a given direction through successive arcs. Tension on the band 75 can be adjusted by loosening the screw 95 and rocking the motor 83 about the pivot 93 to adjust spacing of shaft 85 from the band end portions 79.

A pivot 125 defines the axis about which the link 109 is rockable. The pivot is disposed in the space 127 between the legs 121 of said link in bearing engagement therewith. Said pivot is adjustable toward and away from the shaft 85. Thereby, the character of the phases of the cycles of link 109 can be adjusted. To that end, said pivot is secured to a pivot mount 129 and projects forwardly therefrom between said legs 121. One end of the pivot mount is pivotally and releasably secured by fasteners such as screw 131 to the front face of the motor mount portion 89. The other end of said pivot mount is secured by a screw 133, the head of which impinges the thereto proximate pivot mount end portion 135 against the outer face of said motor mount, as illustrated in FIG. 3. The screw 133 projects through a slot 137 in end 135, said slot being proportioned to permit swinging of the pivot mount about the axis provided by the screw 131.

In accordance with the present invention, the speed of the motor may be such that intermittent increments of motivating torque are applied to the ring 41 in such rapid succession that it appears to be moving continuously. Moreover, attention is invited to the fact that the arrangement of parts is such that the ring 41 is drivable in either direction, that is to say, either clockwise or counterclockwise with respect to FIGS. 1 and 3 in accordance with the angular direction of shaft 85.

As the ring 41 is driven in either direction, it will cause rotation of the zoom lens control body 43 in a corresponding direction about the optical axis of the camera 11. Rotatability of the ring 41 is limited, however. That is to say, engagement of cam followers 71 and 73 with the ends of the cam slot 67 and 69 limits rotation of body 43. Should the motor continue to drive link 109 while the body 43 is held from rotation, as aforesaid, said band will slip on the ring 41 if said band has been properly tensioned, as aforedescribed. Thereby, motor stalling and circuit drain can be obviated.

To insure slippage of the band 75, when the body 43 is held, even in the event of overtensioning of band 75, the link 109 is fabricated from a flexible plastic material that will bend or yield upon building of tension in said band of a magnitude larger than the torque normally required to drive ring 41. Accordingly, if band 75 will not slip normally when the body 43 is held, it will be tensioned to a level great enough to bend the link and thereby break the engagement between the band 75 and ring 41 during the tension phase of the link cycle.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A power transmission adapted to convert a continuously motion into intermittent torque and comprising a reversibly rotatable body;

a friction band disposed about and partially encircling said body for intermittent frictional driving engagement therewith;

an eccentric mounted for reciprocation by a reversible continuously rotational member;

a link arranged about said eccentric for reciprocation;

said friction band having a pair of opposite end portions connected to said link;

whereby upon rotation of the eccentric the band is alternately tensioned and relaxed upon said rotational body thereupon to intermittently impinge reversibly rotational torque corresponding to the direction of eccentric rotation.

2. A power transmission as defined in claim 1 in which the link has a pair of spaced apart legs to which the ends of said band are connected, and having axis means about which said link is rockable, said axis means being disposed between said legs and parallel to the center of eccentric rotation.

3. A power transmission as defined in claim 2 further characterized by adjusting means for selective positioning of the axis means to vary the character of the phases of the link cycles.

4. A power transmission means as defined in claim 1 further characterized by adjustable spacing means for varying the distance of the center of eccentric rotation from the ends of said band to control the periods of the tensioning and relaxing band phases.

5. A power transmission as defined in claim 4 in which the adjustable spacing means comprises an apertured mount; a continuously rotational member supported by said mount in reciprocating association with said eccentric, and pivot means for rocking said mount to adjust the tension on said band.

6. A power transmission as defined in claim 1 in which the link has a pair of spaced apart legs connected to the end portion of said band;

an apertured motor mount;

a motor supported by said apertured motor mount and having an output shaft projecting into rotational association with said eccentric;

a first pivot for said motor mount to move said eccentric toward and away from said body to vary band tension thereon, a pivot mount rockably mounted on said motor mount;

a second pivot carried by said pivot mount and arranged in adjusted positions between the legs of said link to provide an adjustable center for rocking said link and adjusting the phases of link cycles.

7. A power transmission as defined in claim 1 in which the rotational body is arranged for limited rotation, and having clutch slip means for causing said band upon tensioning for driving to free said body when held against rotation.

8. A power tarnsmission as defined in claim 1 in which the body is arranged for limited rotation in both directions about its rotational axis, and having adjusting means for varying spacing between the rotational axis of said eccentric and the end portions of said band thereby to adjust tension on said band for slippage about said body when held from rotation during the driving phase of the eccentric.

9. A power transmission as defined in claim 7 in which the link is of yieldable fabrication to provide said clutch slip means and will bend when tensioned by a torque greater than that required to rotate said body to release tension on said band.

10. In combination with a power transmission as defined in claim 9, a zoom lens assembly having objective means mounted for adjustment in opposite directions longitudinally of the axis of said rotatable body, and torque translation means for impinging the torque of said body on said objective as a lineal force for adjustment of said zoom lens assembly.

References Cited

UNITED STATES PATENTS

| | | | |
|---|---|---|---|
| 3,200,699 | 8/1965 | Graves | 350—187 |
| 3,324,780 | 6/1967 | Minauchi | 95—45 |
| 3,329,075 | 7/1967 | Padelt | 95—45 |
| 3,351,411 | 11/1967 | Chapman | 350—187 |

NORTON ANSHER, *Primary Examiner.*

C. B. FUNK, *Assistant Examiner.*